June 7, 1966 P. E. MYERS 3,254,746
CLUTCH FOR ELECTRIC MOTORS
Filed April 12, 1965 3 Sheets-Sheet 1

INVENTOR
Philip E. Myers
By Wolfe, Hubbard, Voit & Osann
ATTORNEY

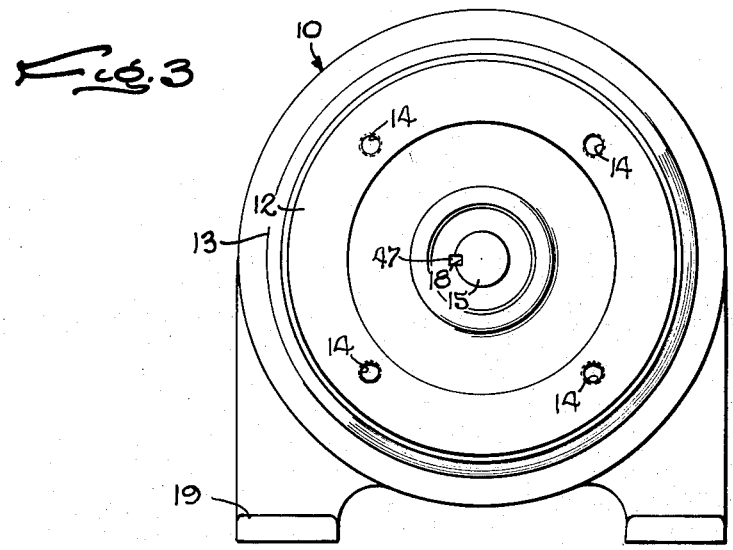
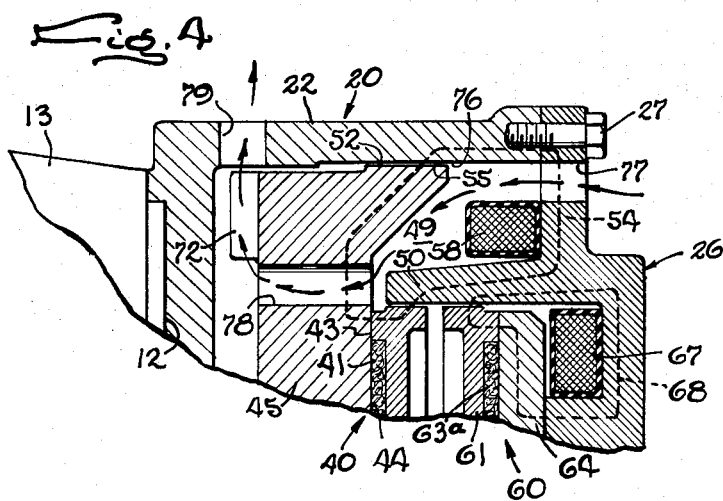

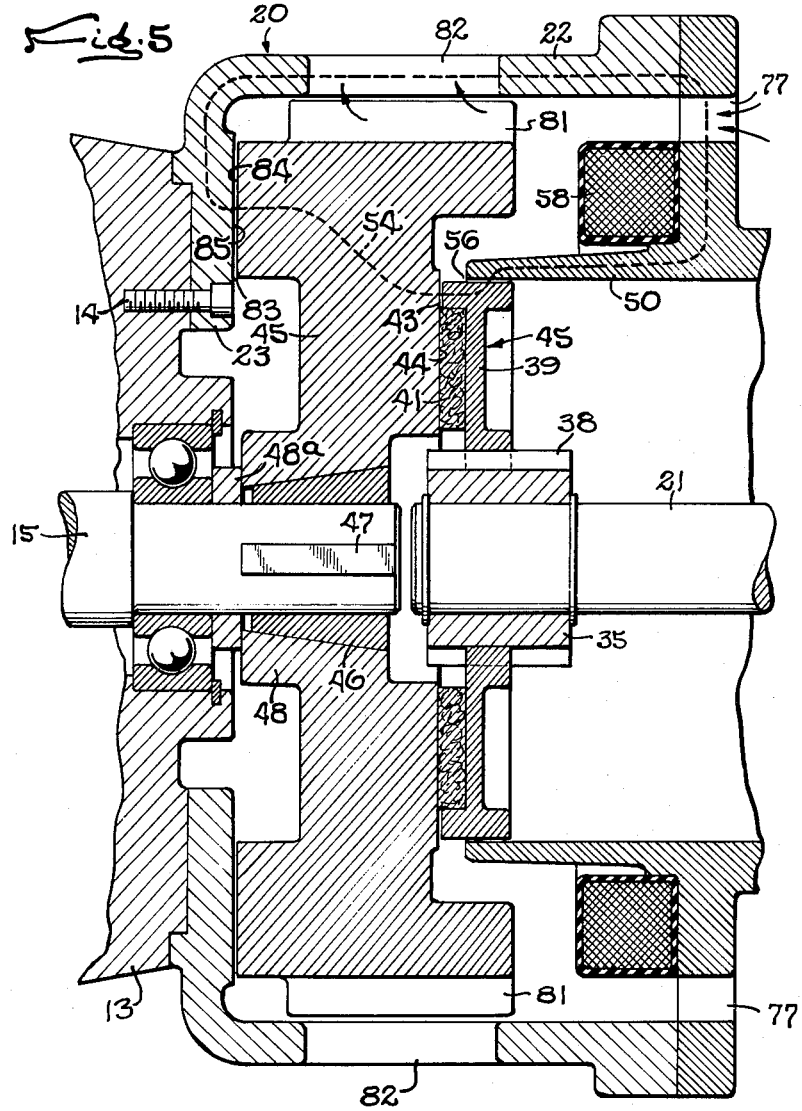

United States Patent Office 3,254,746
Patented June 7, 1966

---

3,254,746
CLUTCH FOR ELECTRIC MOTORS
Philip E. Myers, Beloit, Wis., assignor to Warner Electric Brake & Clutch Company, South Beloit, Ill., a corporation of Delaware
Filed Apr. 12, 1965, Ser. No. 448,580
5 Claims. (Cl. 192—84)

This application is a continuation-in-part of my copending application Ser. No. 239,613, filed November 23, 1962, and now abandoned.

The invention relates to a magnetic clutch incorporated in a hollow auxiliary end bell attached to one end of an electric motor casing, the driving element of the clutch being a flywheel fixed to the motor shaft.

The general object is to reduce the overall size of a clutch arrangement of the above character by using the flywheel as a part of the toroidal flux circuit by which the magnetic clutch is activated.

The invention also resides in the novel arrangement of the parts of the flywheel, the end bell and the flywheel to achieve optimum compactness while maintaining high magnetic efficiency in the operation of the clutch.

Still another object is to provide for air cooling the clutch in an attachment of the above character.

Other objects and advantages of the invention will become apparent from the following detailed description taken in connection with the accompanying drawings, in which FIGURE 1 is an elevational view of an electric motor of standard casing design having an auxiliary end bell housing a magnetic friction clutch arranged in accordance with the present invention, part being broken away shown in section taken along the line 1—1 of FIG. 2.

FIG. 3 is a face view of the electric motor per se.

FIGS. 4 and 5 are fragmentary views similar to FIG. 1 showing modified forms of the invention.

Figure 1:
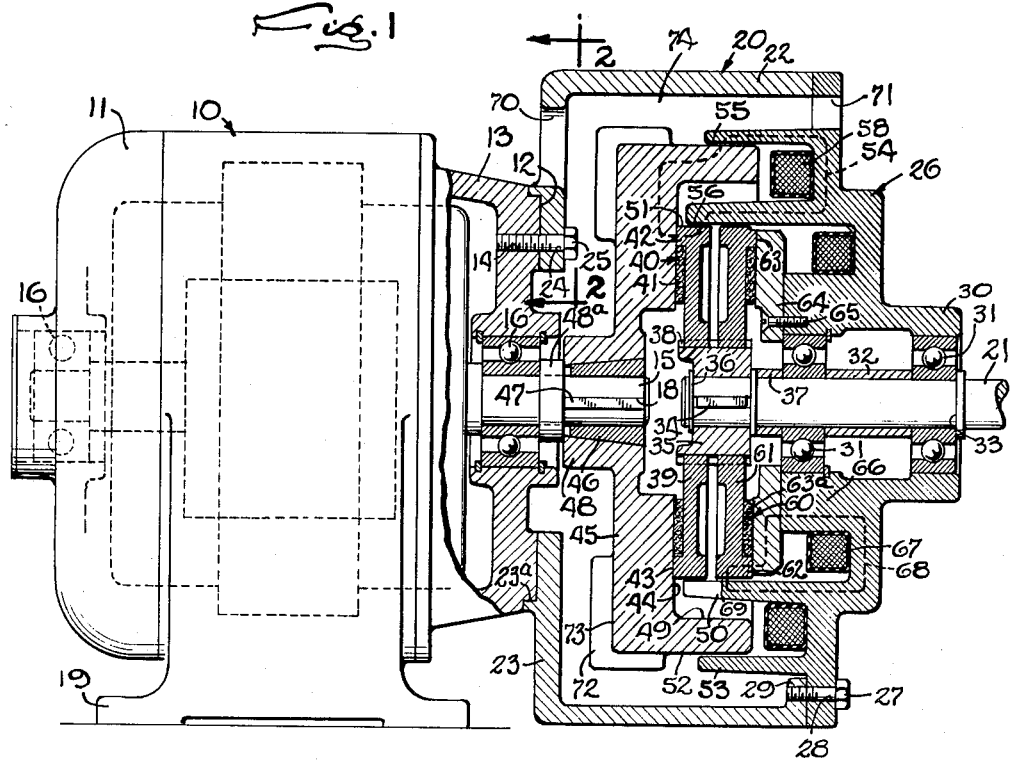

In the form shown in FIG. 1, the invention is shown incorporated in an electric motor 10 having a multiple part casing 11 of the so-called face mounted or C type in which the exposed face 12 of the end bell 13 from which the motor shaft 15 projects is flat and formed with a dimensionally standardized annular series of fittings or tapped holes 14 for receiving screws for securing the motor to a supporting structure or attaching various accessories to the motor. The holes are parallel and spaced around the shaft which is journaled in bearings 16 in the end bells and is formed at its exposed end with a keyway 18 for coupling the shaft to the part to be driven. Such motors are also usually equipped with feet 19 apertured to permit the side of the motor casing to be bolted to a support.

The present invention contemplates the attachment to the motor through mountings of the above general character of an auxiliary end bell 20 in which an outwardly projecting shaft 21 is journaled intermediate its ends and adapted to be coupled at its inner end to the main motor shaft 15 through the medium of an electromagnetic friction clutch 40 the parts of which are mounted on or within the auxiliary end bell and the main shaft. Preferably, the auxiliary end bell is composed of two parts one of which in the forms shown is a rigid generally cylindrical tube 22 having an inturned flange 23 at one end adapted for abutment against the end face 12 of the motor housing and formed with angularly spaced holes 24 adapted to register with the holes 14 and receive screws 25 for clamping the tube to the end 12 of the motor housing in proper concentricity with the main shaft 15 as determined for example by telescoped pilot surfaces 23ª. The tube 22 thus attached to the motor projects well beyond the end of the main shaft 15 and is closed at its outer end by a cap 26 suitably centered accurately on and against the outer end of the tube to which it may be clamped by screws 27 extending through accurately located holes 28 and threading into inturned lugs 29 in the tube. At least the cap 26 of the end bell is composed of magnetic material.

The shaft 21, which is alined axially with the main motor shaft 15, projects through the cap 26 and beyond an outwardly projecting hub 30 thereon and is journaled intermediate its ends in inner antifriction bearings 31. The latter is separated by a spacer 32 and positioned axially by a shoulder 33 on the shaft at the outer end of the hub. The inner end of the shaft 21, which is disposed adjacent the outer end of the motor shaft, is received in and secured as by a suitable key 34 to a ring 35 disposed between a snap ring 36 and a spacer 37 abutting the inner race ring of the inner bearing 31. The ring 35 is formed with external spline teeth 38 loosely mating with internal teeth on a disk 39 of magnetic material which is disposed near the inner end of the shaft 21 and is the driven member of the friction clutch 40. Secured to the inner face of this disk is a flat ring 41 of friction material confined within a flange 42 whose end face 43 is flush with the face of the friction ring, the two faces being adapted for axial gripping engagement with an end face 44 on a flywheel 45 coupled to the outer end of the motor shaft 15 and composed of magnetic material so that it may be utilized as later described to perform several additional functions. Herein the coupling is effected through a conventional adapter bushing 46 coupled by a key 47 to the motor shaft and telescoped into an internally tapered hub 48 of the flywheel to which the bushing is clamped by suitably clamping in an axial position which may be determined by a spacer 48ª.

In the present instance, the flywheel surface 44 which constitutes the driving element of the friction clutch 40 is at the bottom of an end recess 49 into which projects a tubular flange 50 integral with the inner side of the cap 26 and telescoping closely at its inner end with the outer cylindrical surface 51 of the driven clutch disk 39. The outer periphery 52 of the flywheel is cylindrical and telescopes closely within an internal cylindrical surface on a second tubular flange 53 integral with and projecting inwardly from the cap 26 near the outer periphery thereof. A flux circuit 54 of toroidal shape is thus formed by the end cap 26, the pole flanges 50 and 53 fixed thereto, the flywheel 45 and the outer edge portion of the driven clutch disk 39. Thus, the circuit includes a radial gap 55 between the closely telescoped flywheel surface 52 and the internal stationary surface of the pole flange 53 and a second radial gap 56 between the outer periphery of the clutch disk 39 and the inner surface of the inner pole flange 50. The gaps are sufficiently large in area to carry the flux required for producing the desired high density between the axially engaging driving and driven faces 44 and 43 of the clutch.

Such flux is created by energization of a multiple turn annular winding 58 disposed within the flux circuit 54 and suitably secured to the auxiliary end bell, in this instance between the flanges 50 and 53 and near the end cap 26. It will be apparent that when the winding is energized, flux threading axially through the opposed clutch faces will draw the disk 39 axially into gripping engagement with the rotating flywheel thus deriving a friction torque for picking up the load coupled to the shaft 21. When the winding is deenergized, the clutch will be released thus permitting quick stopping of the shaft and the driven parts coupled thereto.

Such stopping is effected by an energization of a magnetic friction brake 60 also enclosed within the auxiliary end bell 20 and forming part of the improved motor attachment. The brake includes a disk 61 of magnetic material loosely splined on the ring 35 adjacent the clutch disk 39. The cylindrical outer surface of this disk telescopes closely within the stationary pole flange 50. A narrow axially projecting flange 62 around the periphery of the disk 61 defines an axial pole face 63 which is flush with the exposed face of a flat ring 63ᵃ of friction material secured to the disk within the flange. The stationary face of the friction brake is on a flat ring 64 secured by screws 65 to the end of a tubular flange 66 concentric with the pole flange 50 and integral with and projecting inwardly from the end cap 26.

A multiple turn annular winding 67 is secured to the cap 26 between the flanges 50 and 66 and is thus enclosed within a magnetic flux circuit 68 of toroidal shape extending radially through the end cap 26, axially through the pole flange 50, then inwardly across the gap 69 to the disk 61, axially through the pole face 63 into the ring 64, radially through the latter and finally along the flange 66 to the end cap. Thus, when the winding 67 is energized, the disk 61 is drawn into gripping engagement with the stationary ring 64 thus applying a friction braking torque to the disk for arresting the motion of the shaft 21 and the load coupled thereto.

Figure 2:
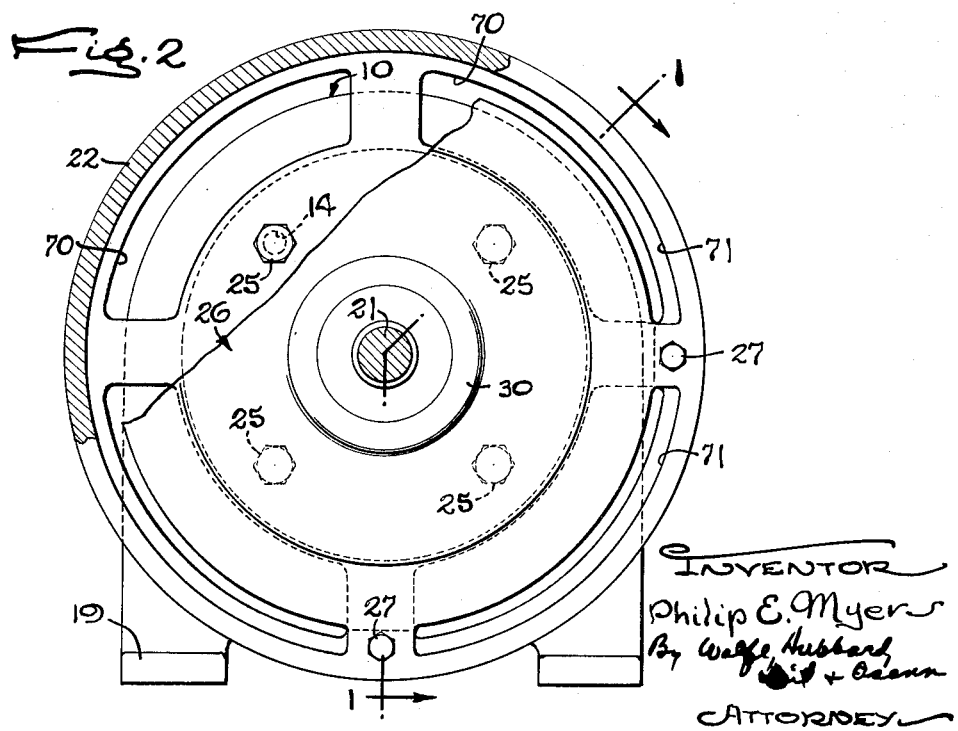
FIG. 2 is a right end view partially broken away along a section line 2—2 of FIG. 1.

The flywheel and the auxiliary end bell construction and arranged as described above are adaptable at minimum added cost for efficient air-cooling of the clutch and brake and the dissipation of the heat developed in heavy duty service of the motor. For this purpose, the outer pole piece 53, in the form shown in FIGS. 1 and 2, is spaced inwardly from the tube 22 and arcuate angularly spaced holes 70 and 71 are formed in the flange 23 and the end cap 26 thus forming around the clutch and brake an open-ended passage 74 of substantial cross-sectional area. To induce the flow of a large volume of air through this passage, vanes 72 are cast integral with or otherwise secured to the flywheel 45 and disposed in radial planes angularly spaced around the inner face 73. Herein, the vanes also extend around the edge of this face and a short distance along the outer periphery 52 of the flywheel.

With the vanes thus constructed and disposed opposite the holes 70 in the flange 23, rotation of the flywheel will induce an outward flow of air which is forced out of the end bell through the holes 71. This induces the flow of a corresponding volume of air into the bell through the holes 70 and along the passages 74 to which the frictionally generated heat is radiated after conduction outwardly through the clutch and brake parts and the associated magnet structures. With such effective air cooling of the auxiliary end bell and the parts housed therein, the clutch and brake may be worked at optimum capacity in utilizing the flywheel action in the repeated starting and stopping of a given load with a motor of minimum size.

The construction above described may for certain installations be simplified by utilizing the tubular part 22 of the auxiliary end bell 20 as a part of the flux circuit 54 of the magnetic clutch. Such modification is shown in FIG. 4 in which parts common to FIG. 1 are indicated by corresponding reference numerals. In this instance, the radial air gap 55 in the flux circuit 54 is defined by the outer periphery 52 of the flywheel 45 and an internal cylindrical surface 76 formed in the tube 22 intermediate the ends thereof. The outer end portion of the tube and the outer edge portion of the end cap 26 form parts of the flux circuit as shown in FIG. 4, both of these parts being composed of magnetic material.

As before, the clutch 40 is disposed within a recess 49 in the flywheel which recess may be used advantageously to form passages through which air for cooling the clutch parts may be induced to flow as shown by the arrows in FIG. 4 through the auxiliary end bell by the action of the radial vanes 72 on the inner face of the flywheel.

Arcuate slots 77 form the inlets of the air passages which extend outside of the coil 58, along the pole flange 50 and through angularly spaced apertures 78 formed in the flywheel at about the radius of the flange 50. Beyond the flywheel, the air is forced outwardly by the vanes 72 and is discharged through circumferentially extending slots 79 angularly spaced around the inner end of the tube 22. With the air passages thus disposed in close proximity to the friction surfaces 43, 44 of the clutch, the heat generated in the clutch and brake is dissipated with increased efficiency.

The modification shown in FIG. 5 may be used in installations when greater air cooling is desired, the parts corresponding to those of the forms previously described being indicated by the same reference numerals. In this instance, the flywheel 45 is somewhat smaller than the cylindrical part 22 of the end bell 20 and formed around its periphery with angularly spaced blades 81 of substantial axial length and acting during turning of the flywheel to induce a large volume of air to enter the passages 77 and flow outwardly through slots 82 in the end bell. To provide such air flow path as indicated by the arrows, the flux circuit 54, after threading axially through the clutch face 44, extends through the flywheel 45 and axially across a gap 83 into the flange 23 and finally outwardly and then along the part 22 of the end bell. The gap 83 is defined by opposed flat surfaces 84, 85 on the flywheel and the flange 23 and its narrow width is determined in the initial installation by abutting the flywheel against the collar 48ᵃ.

I claim as my invention:

1. For transmitting power from a shaft projecting from the end of a motor casing, the combination of, a generally cup-shaped end bell composed at least in part of magnetic material and adapted for attachment to said motor casing concentric with the axis of said shaft, a second shaft projecting axially through and journaled intermediate its ends in the closed end of said end bell with the inner end alined with and disposed adjacent the outer end of the motor shaft, a magnetic disk disposed within and substantially smaller in diameter than said end bell fast on the inner end of said second shaft and providing a driven face facing axially toward the motor shaft, a flywheel substantially larger than said driven disk adapted to be secured to said motor shaft and providing a driving clutch face engageable and cooperating with said driven face to form a friction clutch, said flywheel possessing inertia several times that of the combined inertia of said driven disk and second shaft and having a portion adjacent said driven disk composed of magnetic material and cooperating with the disk and said end bell to form a magnetic flux circuit of toroidal shape having parts extending successively along said shafts between said driven disk and said flywheel, through the flywheel, through a narrow air gap between opposed surfaces of the flywheel and said end bell, and an annular multiple turn winding stationarily mounted on said end bell and disposed within said toroidal flux path.

2. A motor attachment as defined in claim 1 in which the outer axial face of said flywheel is recessed and said clutch disk is disposed in the recess and is adapted for gripping engagement with the bottom surface of the recess.

3. A motor attachment as defined in claim 1 in which said narrow gap in said toroidal flux circuit is cylindrical and defined by the external surface of the magnetic portion of said flywheel and an internal surface on said end bell.

4. A motor attachment as defined in claim 1 in which said toroidal flux circuit extends through two narrow radial air gaps, one defined by opposed surfaces of said flywheel and end bell, and the other being between opposed surfaces of said end bell and said disk.

5. The combination as defined in claim 1 in which said winding is offset axially from said flywheel and is of smaller diameter than the latter.

References Cited by the Examiner
UNITED STATES PATENTS

| | | | |
|---|---|---|---|
| 2,315,298 | 3/1943 | Thompson | 192—84 |
| 2,481,028 | 9/1949 | Lear | 192—84 X |
| 2,618,368 | 11/1952 | Hoover | 192—84 X |
| 2,739,251 | 3/1956 | Ingalls | 192—18.2 X |
| 2,859,845 | 11/1958 | Bachman | 192—18.2 |

FOREIGN PATENTS 364,330    1/1932    Great Britain.

DAVID J. WILLIAMOWSKY, *Primary Examiner.*
DON A. WAITE, *Examiner.*
B. W. WYCHE, *Assistant Examiner.*